United States Patent
Gargaro (10) Patent No.: US 7,036,832 B2
(45) Date of Patent: May 2, 2006

(54) OVERSIZED MASSIVE BREAK APART DOLLY

(76) Inventor: Nicholas A. Gargaro, 6800 Otter Lake Rd., Lino Lakes, MN (US) 55038

( * ) Notice: Subject to any disclaimer, the term of this patent is extended or adjusted under 35 U.S.C. 154(b) by 0 days.

(21) Appl. No.: 09/968,484

(22) Filed: Sep. 29, 2001

(65) Prior Publication Data

US 2003/0062699 A1    Apr. 3, 2003

(51) Int. Cl.
    *B62B 1/00*    (2006.01)
(52) U.S. Cl. .............. 280/47.131; 280/47.19; 280/47.35
(58) Field of Classification Search .......... 280/47.131, 280/47.19, 47.29, 47.27, 47.331, 47.18, 47.17, 280/43.1, 43.11, 638, 35, 651, 652, 47.34, 280/47.35, 414.3; 403/300, 301, 302, 305, 403/306, 310, 286
    See application file for complete search history.

(56) References Cited

U.S. PATENT DOCUMENTS

| | | | | |
|---|---|---|---|---|
| 502,686 | A | * | 8/1893 | Tilton .................... 403/300 |
| 953,506 | A | * | 3/1910 | Baum ...................... 144/242.1 |
| 1,458,666 | A | * | 6/1923 | Stoppello .................. 403/305 |
| 2,326,941 | A | * | 8/1943 | Heitner ...................... 403/286 |
| 2,446,300 | A | * | 8/1948 | Nelson et al. .................. 174/7 |
| 2,540,279 | A | * | 2/1951 | Mosier ................ 280/414.2 |
| 2,667,984 | A | * | 2/1954 | Proehl .................... 414/461 |
| 3,084,820 | A | * | 4/1963 | Malo ........................ 414/445 |
| 3,476,413 | A | * | 11/1969 | Coberly et al. .......... 285/332.3 |
| 3,667,728 | A | * | 6/1972 | Garelick .................... 254/8 R |
| 3,865,392 | A | * | 2/1975 | Hartway .................... 280/35 |
| 4,248,453 | A | * | 2/1981 | Stark ........................ 280/655 |
| 4,362,309 | A | * | 12/1982 | Stamper .................. 280/47.19 |
| 4,392,665 | A | * | 7/1983 | Miller et al. .............. 280/414.2 |
| 4,431,211 | A | * | 2/1984 | Carrigan ..................... 280/655 |
| 4,570,953 | A | * | 2/1986 | McPeak et al. .............. 280/5.3 |
| 4,603,872 | A | * | 8/1986 | White .................... 280/47.331 |

(Continued)

FOREIGN PATENT DOCUMENTS

DE    3501904 A1 *  9/1986

OTHER PUBLICATIONS

Tucker-Rocky Distributing, Heavy Duty Snowmobile Shop Dolly (A) and Snow Stuff Heavy Duty Shop Dolly (B), Tucker Rocky Distributing 1995-1996, Snowmobile Catalog, 1995, cover page and p. 499, Tucker-Rocky Distributing, Fort Worth, Texas.*

(Continued)

*Primary Examiner*—Christopher P. Ellis
*Assistant Examiner*—Kelly E. Campbell (57) ABSTRACT

An oversized, break apart dolly for picking up and lifting massive articles such as snowmobiles. The dolly stands more than six feet tall. A typical operator of the dolly brings his arms over his head to reach the handle of the dolly, and then uses his weight to draw the handle down to in turn lift up the other end of the dolly that is engaging and lifting the heavy article. The oversized dolly can be adjusted in height and in width to receive articles of different height and width. The pick up of the dolly (the mechanism that engages the article) can be adjusted toward and away from a central axis of the dolly to be positioned as desired on the heavy article. The oversized dolly may be broken down to a relatively compact size by the legs being removably engagable with the handle, by the pick ups being removably engagable from the legs, and by the legs themselves being broken down into two pieces which are reassembled when needed.

4 Claims, 7 Drawing Sheets

U.S. PATENT DOCUMENTS

| | | | | |
|---|---|---|---|---|
| 4,630,837 A | * | 12/1986 | Kazmark | 280/47.2 |
| 4,896,897 A | * | 1/1990 | Wilhelm | 280/655 |
| 5,078,534 A | * | 1/1992 | White | 403/292 |
| 5,176,394 A | * | 1/1993 | Veazey | 280/414.2 |
| 5,328,192 A | * | 7/1994 | Thompson | 280/47.24 |
| 5,716,061 A | * | 2/1998 | Sloan et al. | 280/43.23 |
| 5,727,920 A | * | 3/1998 | Hull et al. | 414/476 |
| 6,015,254 A | * | 1/2000 | Keeler | 414/447 |
| 6,071,061 A | * | 6/2000 | Monnin | 414/457 |
| 6,079,941 A | * | 6/2000 | Lee | 414/812 |
| 6,244,603 B1 | * | 6/2001 | Rizzardi | 280/47.331 |
| 6,488,157 B1 | * | 12/2002 | Chen | 211/20 |

OTHER PUBLICATIONS

Northern Wholesale Supply, Heavy Duty Snowmobile Shop Dolly (C ), Northern Wholesale Supply Snowmobile ATV, 1996, cover page, title page, pp. 15 and 162, Northern Wholesale Supply, Lino Lakes, Minnesota.*

Tucker-Rocky Distributing, Heavy Duty Snowmobile Shop Dolly (A) and Sno Stuff Heavy Duty Shop Dolly (B), Tucker-Rocky Distributing 1995-96 Snowmobile Catalog, 1995, cover page and p. 499, Tucker-Rocky Distributing, Fort Worth, Texas.

* cited by examiner

OVERSIZED MASSIVE BREAK APART DOLLY

FIELD OF THE INVENTION

The present invention relates generally to a dolly, particularly to a oversized and massive dolly, and specifically to an oversized and massive dolly that may be disassembled for shipment, storage and safety.

BACKGROUND OF THE INVENTION

A soccer field is dangerous because it has two large dangerous objects that are attractive for a child: the soccer goals. A child may climb up to the crossbar or jump up to the crossbar. The soccer goal, if not properly anchored to the ground, may then tip under even the relatively small weight of a child, whereupon the crossbar may pin the child to the ground or hit and pin other children as it tips and topples.

Like soccer goals, large man size tools are dangerous. One such tool is the oversized and massive dolly that is used to lift snowmobiles. The dolly includes a handle having a crossbar. The large dolly is attractive to children 1) who would enjoy jumping up to the crossbar to thereby immediately and dangerously tilt the dolly and/or 2) who would enjoy jumping up to the crossbar to bring the dolly into position to wheel one of their friends.

Present dollies have handles that are removable and pick up means that are removable, but these dollies remain potentially deadly for children because the dolly remains "loaded." In other words, the legs remain assembled and each of the legs may be used as a cart or in the nature of a wheelbarrow. Or the legs remain only one step removed from being used together as a complete working toy having two wheels, with or without the pick up means.

Without improvement, the present snowmobile dolly is readily available to children in the summer when skateboarding and roller blading activities are in full swing, exactly when their father works on his snowmobile or moves the snowmobile from place to place in the yard or to and from the garage.

SUMMARY OF THE INVENTION

A feature of the present invention is an oversized and massive dolly that when in operation is more than six feet tall and that when broken down for shipment or storage or safety fits in a rectangular box measuring 26 inches by 40 inches by 7 inches.

Another feature of the present invention is the provision in an oversized and massive dolly, of the legs being broken down into two nonoperable pieces that are removably engagable to each other.

Another feature of the present invention is the provision in an oversized and massive dolly, of a pair of legs that may be disassembled for shipment or storage or safety and then reassembled for operation, wherein the legs maintain sufficient strength when reassembled to pick up even heavy articles such as snowmobiles.

Another feature of the present invention is the provision in an oversized and massive dolly, of the upper and lower portions of the legs being fixedly engagable to each other at different locations from each other such that the legs and thus the dolly as a whole is adjustable in height and is therefore adjustable in the amount of leverage that can be provided to pick up an article.

Another feature of the present invention is the provision in an oversized and massive dolly, of each of the two pieces of the disassembled leg measuring between about 25% and about 75% of the distance of the leg as a whole when it is assembled.

Another feature of the present invention is the provision in an oversized and massive dolly, of each of the two pieces of the disassembled leg measuring between about 40% and about 60% of the distance of the leg as a whole when it is assembled.

Another feature of the present invention is the provision in an oversized and massive dolly, of the lower portion of the leg being in one piece where the wheel is engaged, and wherein the lower portion of the legs includes two linear portions traveling away from the wheel and wherein the linear portions are disposed at less than a 90 degree angle relative to each other so as to provide for unitary leverage on either side of the wheel and between the handle and the pick up.

Another feature of the present invention is the provision in an oversized and massive dolly, of the upper and lower portions of the legs being engagable to each other with an external connection.

Another feature of the present invention is the provision in an oversized and massive dolly, of the upper and lower portions of the legs being engagable to each other with an internal connection.

An advantage of the present invention is safety. Like many large tools, the present invention is attractive to children. One feature contributing to the advantage of safety is that the legs may be disassembled. The chance that any part of the dolly may be used as a toy is thereby minimized. Another feature contributing to the safety advantage is that when the legs are disassembled, when the handle is removed from the legs, and when the pick up means is removed, the dolly may be placed in a smaller box that is more convenient—and therefore more safe—for the father to store in an out-of-the-way location in the garage. Without disassembly of the legs, each of the legs as a whole is an odd object that takes up a relatively great amount of space that proves difficult for the father to tuck away.

Another advantage of the present invention is that the amount of leverage required to lift a heavy article may be adjusted. By providing a connection between the upper and lower portions of the legs that may fix the upper and lower portions at varying distances from each other, the height of the crossbar (or gripping portion of the handle) may be raised or lowered. A taller woman may wish to have greater leverage for her snowmobile. A shorter stronger man may desire a shorter and more accessible crossbar.

Another advantage is cost. The present invention is relatively inexpensive to manufacture, ship and store. The present invention further minimizes the potential health costs of accidents to children and the potential health cost of back injuries to adults because the amount of leverage required may be customized to the adult using the dolly.

Another advantage is that the dolly may be customized for the article that is being picked up and carried. Since the legs are adjustable in height, taller and smaller objects may be received within the dolly.

DESCRIPTION

Figure 1:
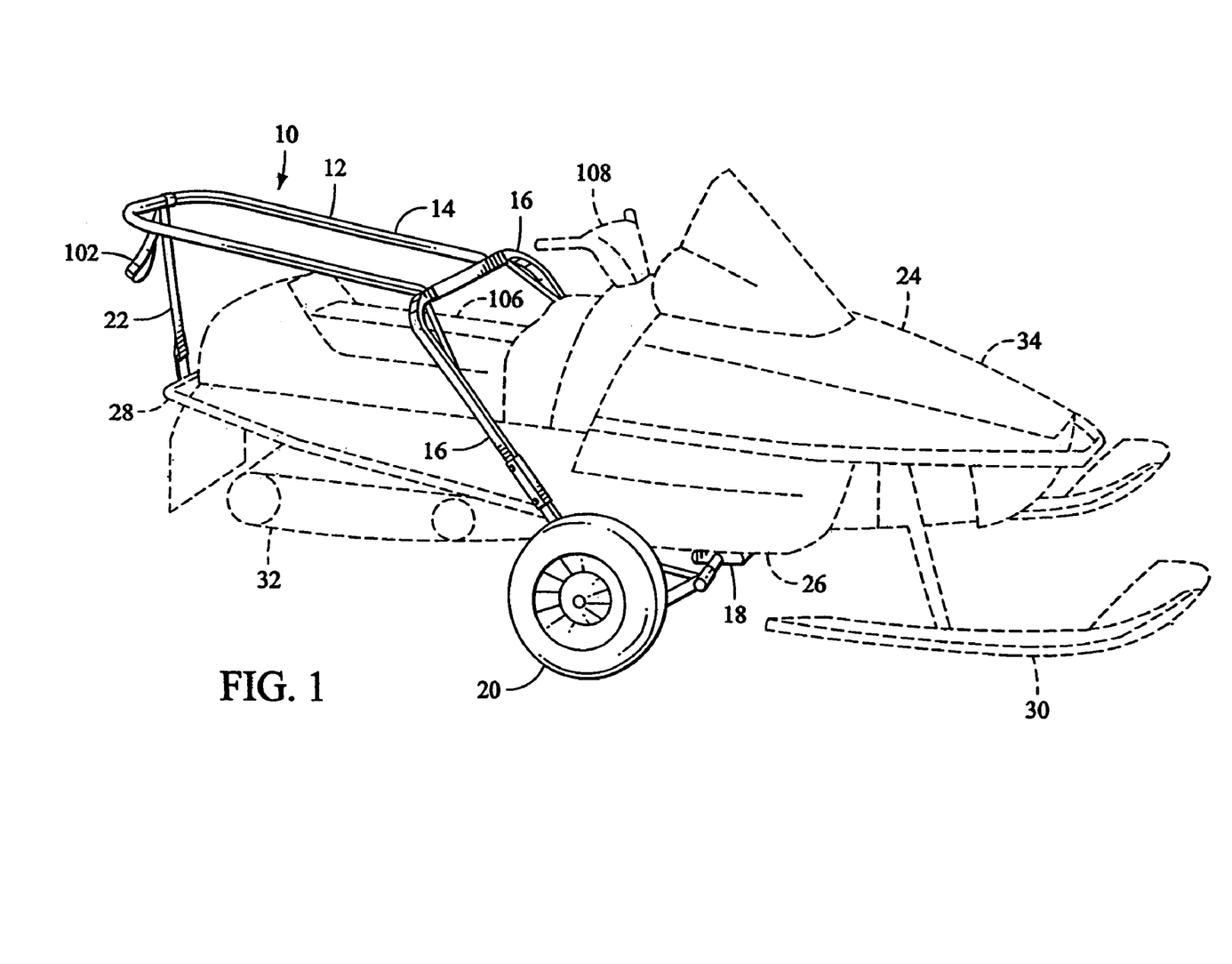
FIG. 1 is a perspective environmental view showing the oversized and massive dolly of the present invention picking up and carrying a snowmobile.

As shown in FIG. 1, the present oversized and massive dolly 10 generally includes a rigid metal frame 12 having a handle 14, a pair of legs 16 and a pair of pick ups 18. The dolly 10 further includes a pair of wheels 20 and a strap 22. The dolly 10 is an oversized and massive dolly for picking up and carrying relatively large and relatively heavy articles or objects such as the snowmobile 24. With the snowmobile, the pick ups 18 engage a frame portion 26 of the snowmobile 24 and the strap 22 engages another frame portion 28 of the snowmobile 24. The dolly 10 lifts the snowmobile 24 entirely off the ground such that the skis 30 and belt drive 32 of the snowmobile are lifted entirely off the ground. The pick ups 18 are preferably placed at or close to the center of balance of the snowmobile 24, which has an engine under the hood 34.

Figure 2:
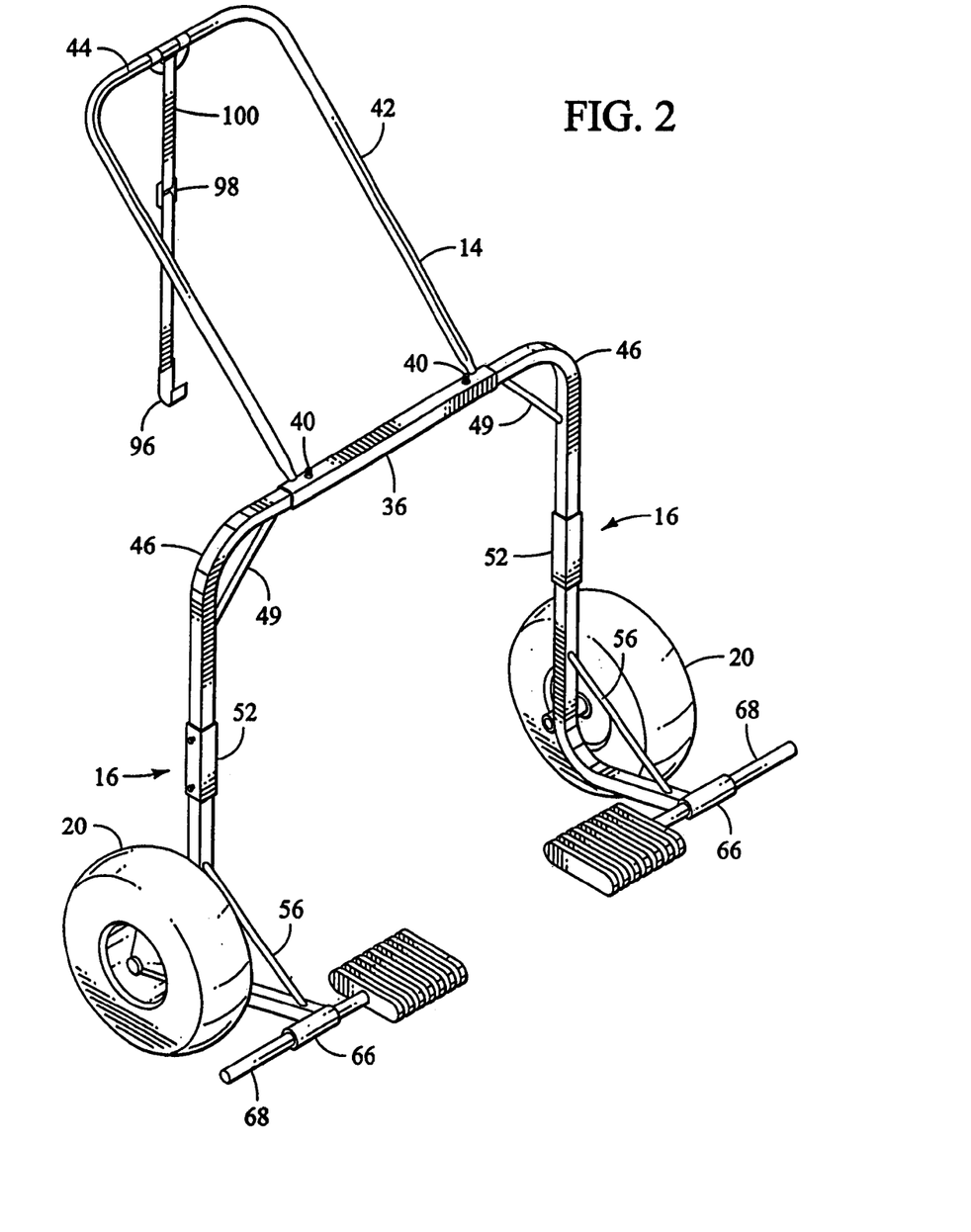
FIG. 2 is a perspective view of the oversized and massive dolly of FIG. 1.
Figure 3:
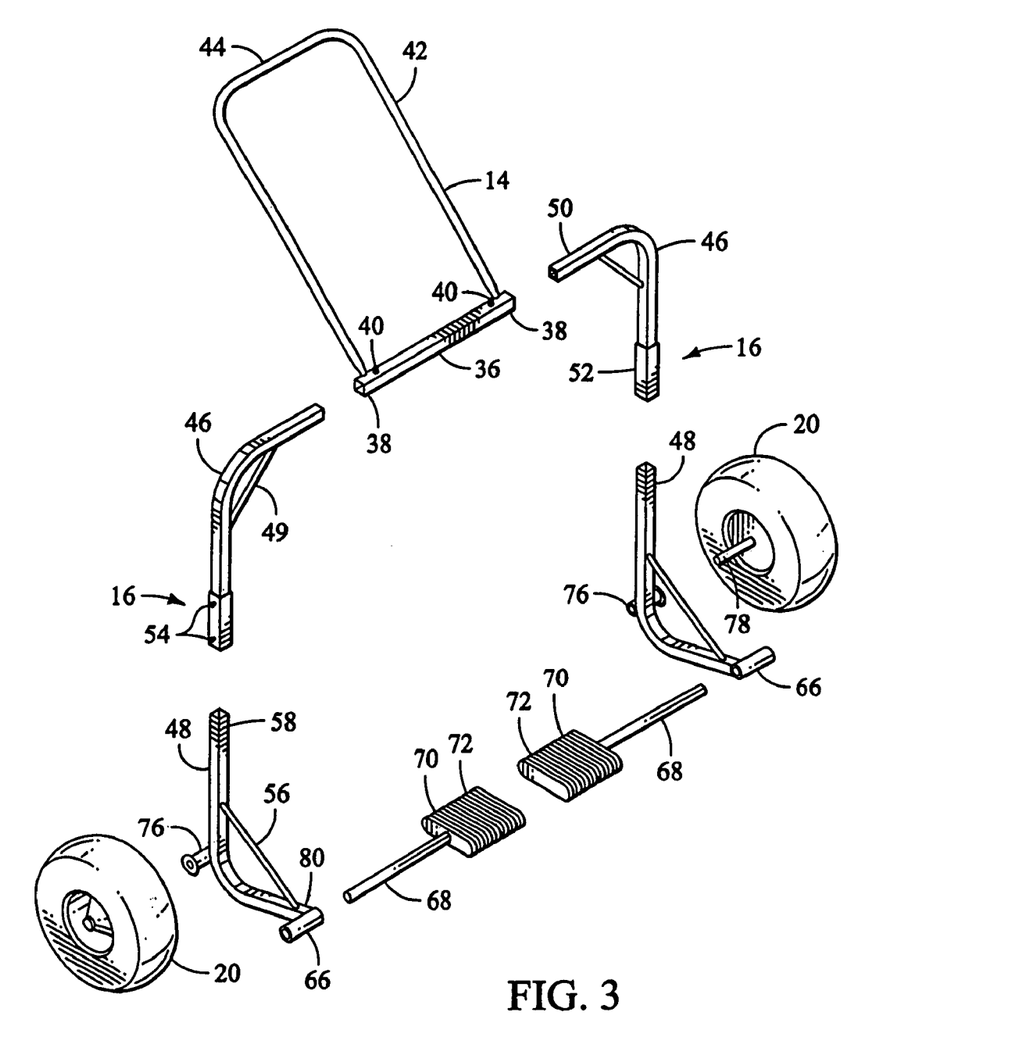
FIG. 3 is an exploded view of the oversized and massive dolly of FIG. 1 being taken from the same perspective as FIG. 2.
Figure 4:
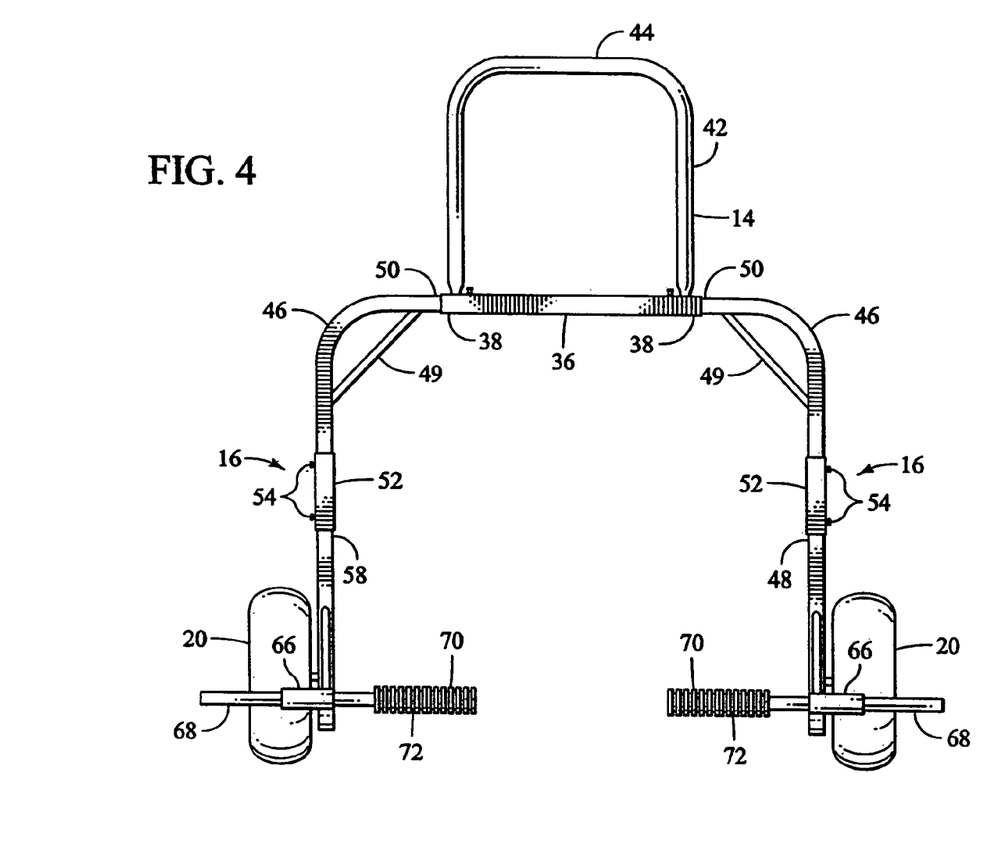
FIG. 4 is a front view of the oversized and massive dolly of FIG. 1.

More particularly, as shown in FIGS. 2–5 with particular reference to FIG. 3, the handle 14 includes a square tubular portion 36 with a pair of receptor ends or connections 38 for receiving cooperating portions of the legs 16. Pins 40, such as set screws, threadingly engage the square tubular portion 36 for being driven into outer surfaces of the legs 16 for fixing the legs 16 in the handle 14. Via the pins 40, the legs 16 may be set at incrementally varying distances from each other such that the dolly 10 may pick up and carry relatively narrow or relatively broad articles. The handle 14 further includes a U-shaped portion 42 rigidly engaged, such as by welding, to the ends or end portions 38 of the square tubular portions 36 such that the handle 14 is one-piece. The U-shaped portion 42 includes a gripping portion or crossbar 44 that is grabbed by the hand to pick up and wheel an article. The crossbar 44 lies six feet, three inches from a surface on which the wheels 20 rest and provides a leverage of great amount relative to the square tubular portion 36, which is inoperable as a hand tool to pick up a heavy article as a snowmobile since the square tubular portion 36 is not set sufficiently high for the leverage that is required to pick up a snowmobile.

Figure 7:
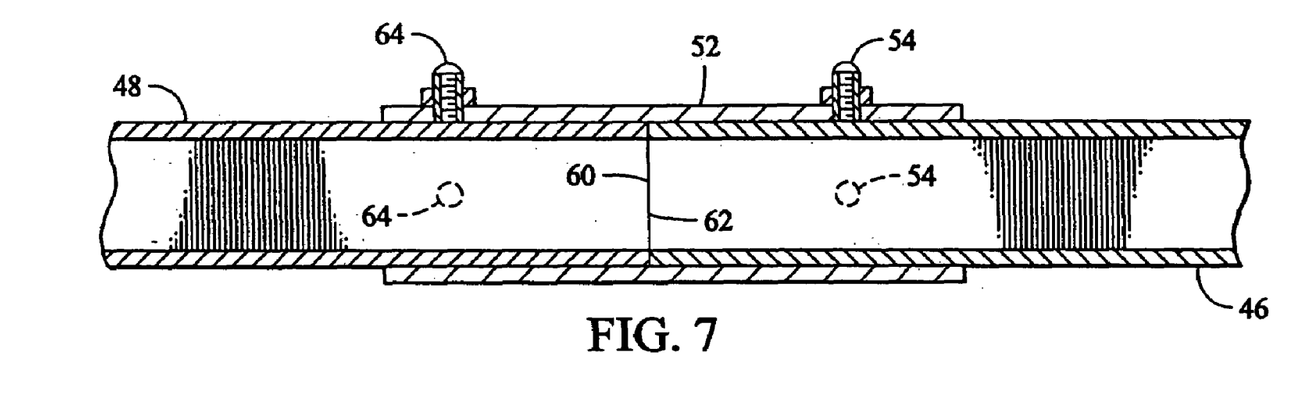
FIG. 7 shows an external height adjustable connection between the legs of the oversized and massive dolly of FIG. 1.

As further shown in FIGS. 2–5 with particular reference to FIG. 3, each of the legs 16 is broken down into an upper leg portion or piece 46 and a lower leg portion or piece 48. Portion 46 is a square tubular L-shaped piece having a brace 49 rigidly welded to and between linear sections of the L-shaped piece 46. Portion 46 includes a male section 50 insertable into female receptor end 38 of the handle 14 and fixed therein by pin 40. Square tubular male section 50 is fabricated to fit with minimal play into square tubular end 38 so as to minimize rotation between the two parts. Opposite of male section 50, portion 46 further includes a female receptor or connection 52. Female receptor 52 is a square tubular piece that is rigidly fixed on an end of portion 46 with set screws 54, as shown in FIG. 7. Or if desired, female receptor 52 may be welded to such end of the portion 46. In either case, the two pieces 46 and 52 engage each other with minimal play so as to minimize rotation therebetween. Female receptor 52 removably engages the other portion 48 of the leg 16.

Figure 5:
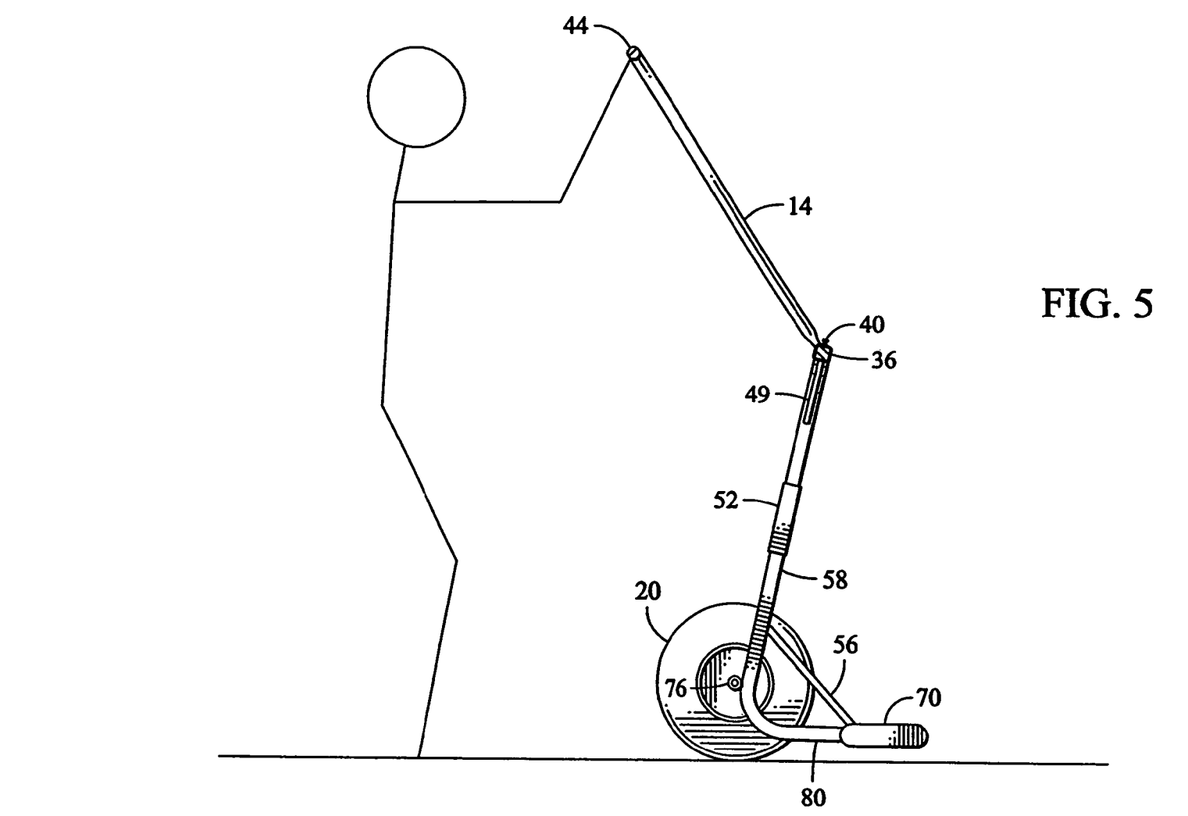
FIG. 5 is a side view of the oversized and massive dolly of FIG. 1 and shows that the dolly is taller than an adult male of average size.
Figure 6:
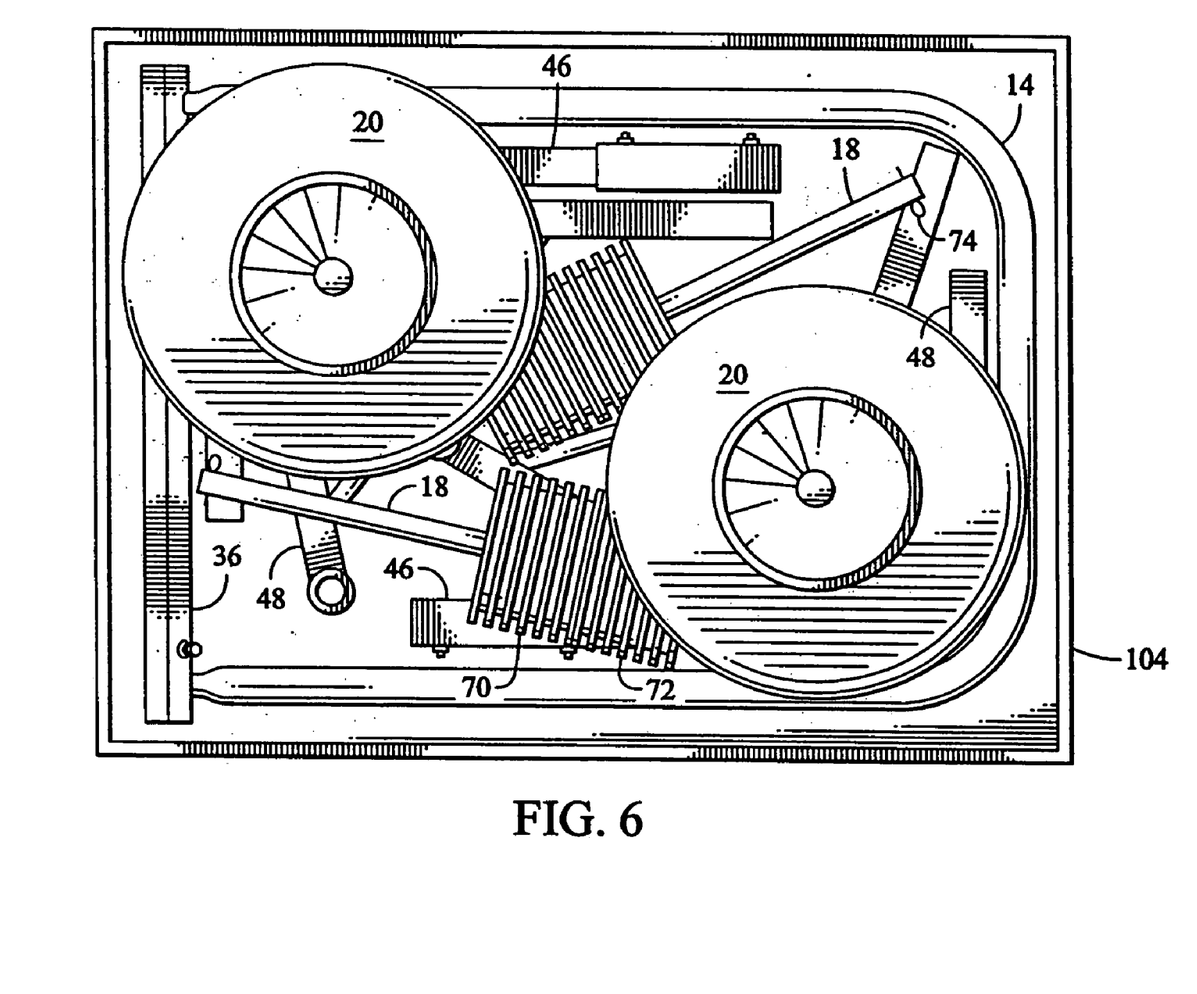
FIG. 6 is a top view of the oversized and massive dolly of FIG. 1 disassembled in a box.

As shown in FIGS. 2–5 with particular reference to FIG. 3, the other leg portion 48 is a square tubular V-shaped piece having a brace 56 rigidly welded to and between linear sections of the V-shaped piece 48. V-shaped lower leg portion 48 includes a male section 58 insertable into female receptor 52 of the upper leg portion 46. The square tubular male section 58 and female receptor 52 are fabricated to fit to each other with minimal play so as to minimize rotation between the two parts. As shown in FIG. 7, an absolute end 60 of the upper leg portion 46 abuts an absolute end 62 of the lower leg portion 48. However, via the pair of set screws 54 of the upper leg portion 46 and a pair of set screws 64 of the lower leg portion 48, the absolute ends 60 and 62 may be fixed apart from each other so as to lengthen the legs 16, thereby increasing the distance of the crossbar 44 from the floor, which in turn increases the amount of leverage available for lifting a heavy article. Such lengthening or shortening of the legs 16 further increases the height of portion 36 and the respective horizontally extending male portions 50 such that the dolly 10 may receive relatively tall or relatively short objects between the legs 16 and underneath portions 36 and 50 and braces 49. Opposite of the male portion 58, the lower leg portion 48 includes a pick up connection or receptor 66 and the pick up 18 which is engaged in the receptor 66. Receptor 66 is welded to an end of lower leg portion 48. Receptor 66 is cylindrical and tubular. Pick up 18 includes a cylindrical tube 68 selected to slidingly engage the receptor 66 with minimal play transversely of the axis along which the pick up 18 slides. Pick up 18 further includes a pair of rubber or elastomeric ribbed pads 70, 72 (as shown in FIG. 6) that are mounted on the cylindrical tube 68. The resilient pads 70, 72 directly engage the frame portion 26 of the snowmobile. The pads 70 and 72 fit on the tube 68 with some friction. The pads 70 and 72 rotate on the tube 68 independently of each other. Opposite of the pads 70, 72, the outer end of the tube 68 includes holes for a cotter pin 74 (as shown in FIG. 6) so that the pick up 18 does not inadvertently slide off of the leg 16. The pick ups 18 of the respective legs 16 may be drawn to and away from each other so as to fit relatively wide articles or snowmobiles and so as to fit relatively narrow articles or snowmobiles. The lower leg portion 48 further includes an axle mount 76 that takes the form of a capped cylindrical tube. An axle 78 of the wheel 20 is rotatably engaged in the mount 76.

As to each of the legs 16 as a whole, portion 50 is a proximal end of leg 16 and pick up receptor 66 is a distal end. Leg 16 runs from portion 50 to and beyond axle 78 of the wheel 20 to the receptor 66. Upper leg portion 46 is removably engagable to lower leg portion 48 via the connection 52.

As a whole, leg 16 stands about 40 inches high when measured from the altitude of the receptor 66 to the altitude of portion 50. Along its length, upper leg portion 46 runs about 30 inches. Along its length, lower leg portion 48 runs about 30 inches. Accordingly, along its length as a whole, leg 16 runs about 60 inches. To render leg 16 inoperable as a toy for children, it is preferable that each of the pieces or portions 46 and 48 runs from about 25% to about 75% of the length of the leg 16 and more preferably about 40% to about 60% of the length of the leg 16.

It can be appreciated that male portion 58 of the lower leg portion 48 is linear and runs toward the wheel 20 and that the lower leg portion 48 includes a second linear portion 80 that runs from distal end or receptor 66 towards the wheel 20. These two linear portions 58 and 80 are set at less than a 90 degree angle relative to each other to provide leverage for the dolly 10. As best shown in FIG. 5, when the dolly 10 is at rest, it can be seen that linear portion 80 is generally parallel to the surface on which the dolly 10 is placed, that linear portion 58 and much of the leg 16 is set at less than a 90 degree angle to linear portion 80, that the legs 16 are on one side of the axle mount 76 and thus axle 78, and that the handle 14 extends from such side of the axle or pivot point 76 to the other side of the axle or pivot point 76 to the relatively high crossbar 44 or point 44 where leverage is applied six feet and three inches above the surface on which the dolly 10 is placed. Such a "Z" shape to the dolly 10 provides a great amount of leverage.

Figure 8:
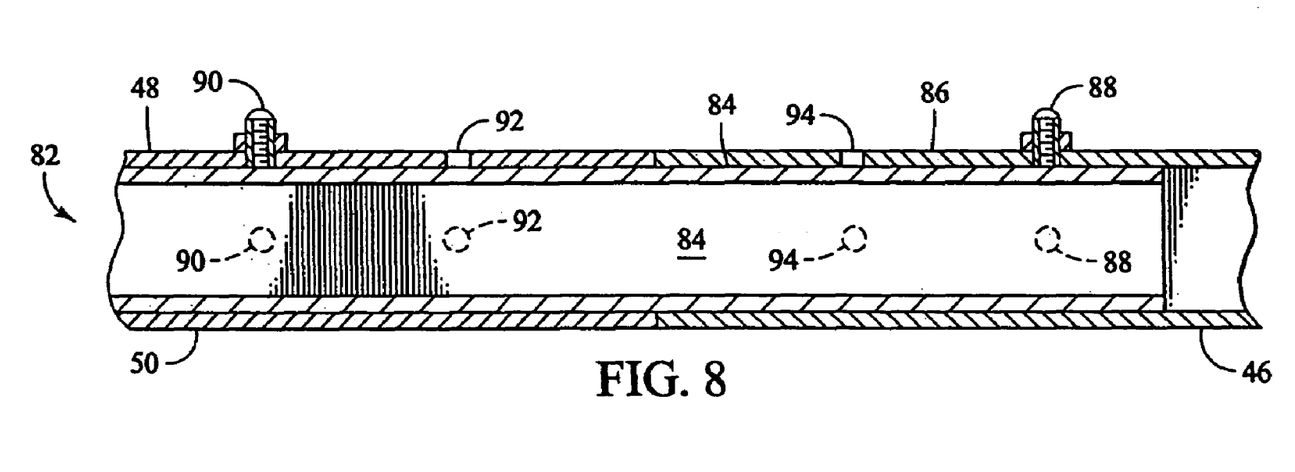
FIG. 8 shows an internal height adjustable connection between the legs of the oversized and massive dolly of FIG. 1.

Whereas FIG. 7 shows an external connection 52, FIG. 8 shows an internal connection 82 that includes an internal square tubular linear piece 84 slideably engagable within portion 50 of lower leg portion 48 and slidingly engagable within a like portion 86 of upper leg portion 46. With the embodiment shown in FIG. 8, the female connection 52 is preferably removed. A pair of set screws 88 and a second pair of set screws 90 fix the internal piece 84 in place and thereby fix the upper and lower leg portions 46 and 48 to each other. Portion 50 includes a pair of second holes 92 for another pair of set screws, if desired, and portion 86 includes a pair of second holes 94 for another pair of set screws. With internal piece 84, the upper and lower leg portions 46 and 48 may be set to abut each other or may be set at varying distances from each other to increase the length of leg 16 and thereby to increase the amount of leverage. Also, the dolly 10 may accommodate articles of greater size because portions 50 and 36 are set at a greater distance from the pick ups 18.

It should be noted that via portions 50 and set screws 40, the legs 16 may be set at incrementally varying distances from each other. Further, via the external connection 52 or the internal connection 82, leg 16 may be set at incrementally varying heights. Also, via receptor 66 and its cooperating pick up tube 68 with fits with some friction in receptor 66, the pick ups 18 may be drawn to and away from each other to be set at incrementally varying distances from each other to engage relatively broad or relatively narrow articles.

It should be noted that crossbar or handle distal portion 44 is preferably between about six feet and about ten feet from a surface on which the wheels 20 rest and more preferably between about six feet and eight feet from a surface on which the wheels 20 rest.

It can be appreciated that dolly 10 may pick up and carry a great number of articles. One such article is the snowmobile. Another such article is the massive tote bag used in manufacturing plants to transport objects from site to site. With the leg 16 having external connection 52 or the internal connection 84, the present dolly 10 may carry between about 300 pounds and about 1000 pounds. A typical snowmobile weighs between about 400 pounds and about 600 pounds, although some extreme lightweight snowmobiles do exist and although some heavy duty or older snowmobiles do exist that weigh more than 600 pounds.

As shown in FIGS. 1 and 2, the heavy duty strap 22 includes a hook 96 for engaging snowmobile frame portion 28 and a buckle 98 for forming a loop 100 for engaging the crossbar 44 of the dolly 10. The strap 22 further includes a handle 102 for drawing the crossbar 44 down. The buckle 98 may be alternately open and closed while the strap 22 is shortened via the handle 102 so as to bring the crossbar 44 and the rear end of the snowmobile toward each other.

As shown in FIG. 6, the dolly 10 when disassembled fits in a rectangular box 104 measuring 26 inches wide by 40 inches across by 7 inches deep. The handle 14 has been separated from the upper leg portion 46, which has been separated from the lower leg portion 48, which has been separated from the pickup means 18. When re-assembled, the crossbar 44 is about six feet, three inches when measured at a 90 degree angle from the surface on which the wheels 20 rest. When re-assembled, the legs 16 are about 39 inches apart at lower leg portions 58.

It should be noted that each of the wheels 20 is tubeless, is filled with air under pressure, and includes a tread.

It should further be noted that external connection or splice 52 and that the internal connection or splice 84 can be variously fixed to the upper and lower leg portions 46 and 48. For example, splice 52 or splice 84 can be permanently fixed, such as by welding, to one of the leg portions 46, 48, and the other of the leg portions 46, 48 can be removably fixed, such as with pin connectors such as set screws or through bolts, to the splice 52 or splice 84. Such through bolts extend through both the splice 52, 84 and the respective leg portions 46, 48. Also if desired, through bolts, instead of set screws, may be used at both ends of the splices 52, 84, to fix the upper and lower leg portions 46 and 48 to each other. As with the set screws, a pair of through bolts running at right angles to each other may be used at each of the ends of the splices 52, 84 such that four through bolts may be used with each of the splices 52, 84 to minimize any play among the upper leg portion 46, the lower leg portion 48, and the splice that is used.

In operation, the dolly 10 is maneuvered so that the wheels 20 roll on either side of the snowmobile 24 and so that the handle portion 36 floats over a seat 106 of the snowmobile 24 so that the snowmobile is received into an opening disposed between the distal ends of the legs and between the pick ups of each of the legs such that the snowmobile may be received between the legs and engaged by the pick ups of the legs. Prior to the handle portion 36 reaching a steering handlebar 108 of the snowmobile 24, the pick ups 18 reach a location disposed outside of the frame portion 26. At this location, the dolly 10 is set on the ground, and the pick ups 18 are slid into the frame portions 26. The strap 22 is then engaged to the frame portion 28 at the rear end of the snowmobile 24. The strap 22 is then shortened incrementally by the buckle 98 to draw the crossbar 44 and rear end of the snowmobile 24 toward each other. At some point during this process, or after the strap 22 has been tightened sufficiently, the crossbar 44 may be drawn down and the snowmobile 24 may be lifted entirely off the ground or surface so that the snowmobile may be wheeled to another location. When being lifted and wheeled, a center of balance of the snowmobile 24 may be over an axis defined by the axles 78 of the wheels 20, or somewhat behind such an axis in the direction of the strap 22. After being wheeled to the desired location, the crossbar 44 is slowly permitted to be raised by the weight of the snowmobile 24 and the snowmobile 24 is thereby slowly lowered to the ground. During such a lowering of the snowmobile 24, the buckle 98 may be incrementally operated to lengthen the effective distance of the strap 22. After the snowmobile 24 again rests on the ground or surface, the pick ups 18 may be drawn out a sufficient distance, so that the dolly 10 can be wheeled rearwardly out of position and away from the snowmobile 24, whereupon the dolly 10 can be disassembled and placed in the box 104 for storage and safety.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

I claim:

1. In combination with a snowmobile, an oversized, break apart dolly for picking up and wheeling the snowmobile, comprising:
   I) the snowmobile; and
   II) the dolly, wherein the dolly comprises:
      a) a pair of wheels, wherein each of the wheels comprises an axis;
      b) a frame on the wheels, wherein the frame comprises:
         i) a handle, wherein the handle provides leverage for picking up said snowmobile;
         ii) a pair of legs, wherein each of the legs comprises a proximal end and a distal end, wherein said proximal end is engaged to the handle, wherein each of the legs runs from the handle to and beyond one respective axis of the wheels, wherein said distal end includes a pick up for engaging the snowmobile to be lifted and wheeled;
         iii) wherein each of said legs comprises two pieces, wherein said two pieces are removably engagable to each other to again form as a whole said leg such that the frame may be broken down for storage and safety, wherein said two pieces include a first piece running from said handle and a second piece engaged to one respective wheel, wherein said second piece includes a first portion engagable to said first piece and running toward said wheel and a second portion running from said distal end and toward the wheel, and wherein said first and second portions are one-piece and set at an angle to each other;
         iv) wherein an opening is disposed between the distal ends of the legs and between the pick ups of each of the legs such that said snowmobile may be received between the legs and engaged by the pick ups of the legs; and
         v) wherein said two pieces are removably engagable to each other with an external connection, with the external connection being on an exterior of each of the two pieces, with each of said two pieces having an absolute end, with said absolute ends confronting each other when the external connection is engaged;
         vi) wherein the external connection is a square tubular piece;
         vii) wherein the external connection is engaged to one of said two pieces via a pair of set screws, with the set screws being set at a right angle to each other; and
         viii) wherein the external connection is engaged to the other of said two pieces via a pair of set screws, with said set screws being set at a right angle to each other; and
      c) a disassembled position where the frame and wheels can fit in an area measuring 26 inches by 40 inches by 7 inches.

2. In combination with a snowmobile, an oversized, break apart dolly for picking up and wheeling the snowmobile, comprising:
   I) the snowmobile; and
   II) the dolly, wherein the dolly comprises:
      a) a pair of wheels, wherein each of the wheels comprises an axis;
      b) a frame on the wheels, wherein the frame comprises:
         i) a handle, wherein the handle provides leverage for picking up said snowmobile;
         ii) a pair of legs, wherein each of the legs comprises a proximal end and a distal end, wherein said proximal end is engaged to the handle, wherein each of the legs runs from the handle to and beyond one respective axis of the wheels, wherein said distal end includes a pick up for engaging the snowmobile to be lifted and wheeled;
         iii) wherein each of said legs comprises two pieces, wherein said two pieces are removably engagable to each other to again form as a whole said leg such that the frame may be broken down for storage and safety, wherein said two pieces include a first piece running from said handle and a second piece engaged to one respective wheel, wherein said second piece includes a first portion engagable to said first piece and running toward said wheel and a second portion running from said distal end and toward the wheel, and wherein said first and second portions are one-piece and set at an angle to each other;
         iv) wherein an opening is disposed between the distal ends of the legs and between the pick ups of each of the legs such that said snowmobile may be received between the legs and engaged by the pick ups of the legs; and
         v) wherein said two pieces are removably engagable to each other with an internal connection, with the internal connection being on an interior of each of the two pieces, with each of said two pieces having an absolute end, with said absolute ends confronting each other when the internal connection is engaged;
         vi) wherein the internal connection is a linear piece;
         vii) wherein the internal connection is engaged to one of said two pieces via welding; and
         viii) wherein the internal connection is engaged to the other of said two pieces via a set of pin connectors, with said pin connector being one of a set screw and through bolt, with said pin connectors being set at a right angle to each other; and
      c) a disassembled position where the frame and wheels can fit in an area measuring 26 inches by 40 inches by 7 inches.

3. In combination with a snowmobile, an oversized, break apart dolly for picking up and wheeling the snowmobile, comprising:

I) the snowmobile; and
II) the dolly, wherein the dolly comprises:
  a) a pair of wheels, wherein each of the wheels comprises an axis; and
  b) a frame on the wheels, wherein the frame comprises:
    i) a handle, wherein the handle provides leverage for picking up said snowmobile;
    ii) a pair of legs, wherein each of the legs comprises a proximal end and a distal end, wherein said proximal end is engaged to the handle, wherein each of the legs runs from the handle to and beyond one respective axis of the wheels, wherein said distal end includes a pick up for engaging the snowmobile to be lifted and wheeled;
    iii) wherein each of said legs comprises two pieces, wherein said two pieces are removably engagable to each other to again form as a whole said leg such that the frame may be broken down for storage and safety, wherein said two pieces include a first piece running from said handle and a second piece engaged to one respective wheel, wherein said second piece includes a first portion engagable to said first piece and running toward said wheel and a second portion running from said distal end and toward the wheel, and wherein said first and second portions are one-piece and set at an angle to each other;
    iv) wherein an opening is disposed between the distal ends of the legs and between the pick ups of each of the legs such that said snowmobile may be received between the legs and engaged by the pick ups of the legs; and
    v) wherein said two pieces are removably engagable to each other with an internal connection, with the internal connection being on an interior of each of the two pieces, with each of said two pieces having an absolute end, with said absolute ends confronting each other when the internal connection is engaged;
    vi) wherein the internal connection is a linear piece;
    vii) wherein the internal connection is engaged to one of said two pieces via welding; and
    viii) wherein the internal connection is engaged to the other of said two pieces via a set of pin connectors, with said pin connector being one of a set screw and through bolt, with one pin connector being set at a right angle via another pin connector.

4. The combination of claim 3, wherein said pin connector is a through bolt, with said through bolt extending through the internal connection and said other of said two pieces.

* * * * *